United States Patent
Tatsumi

(10) Patent No.: US 9,749,264 B2
(45) Date of Patent: Aug. 29, 2017

(54) COMMUNICATION SYSTEM AND NETWORK RELAY DEVICE

(71) Applicant: Hitachi Metals, Ltd., Minato-ku, Tokyo (JP)

(72) Inventor: Tomoyoshi Tatsumi, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 389 days.

(21) Appl. No.: 14/046,440

(22) Filed: Oct. 4, 2013

(65) Prior Publication Data

US 2014/0161132 A1 Jun. 12, 2014

(30) Foreign Application Priority Data

Dec. 10, 2012 (JP) ................................ 2012-269024

(51) Int. Cl.
*H04L 12/931* (2013.01)
*H04L 12/939* (2013.01)

(52) U.S. Cl.
CPC ............ *H04L 49/70* (2013.01); *H04L 49/557* (2013.01)

(58) Field of Classification Search
None
See application file for complete search history.

(56) References Cited

U.S. PATENT DOCUMENTS

| 7,414,985 | B1 * | 8/2008 | Tedijanto | H04L 45/245 370/236 |
| 2004/0103210 | A1 * | 5/2004 | Fujii | H04L 45/00 709/239 |
| 2005/0160171 | A1 * | 7/2005 | Rabie | H04L 12/5695 709/227 |
| 2005/0198381 | A1 * | 9/2005 | Rorie | H04L 12/4641 709/239 |
| 2008/0002570 | A1 * | 1/2008 | Kurokawa | H04L 12/462 370/219 |
| 2008/0068985 | A1 * | 3/2008 | Mieno | H04L 12/66 370/217 |
| 2009/0086663 | A1 * | 4/2009 | Ho | H04W 40/32 370/328 |
| 2010/0329147 | A1 * | 12/2010 | Nam | H04L 45/00 370/254 |
| 2011/0075559 | A1 * | 3/2011 | Katsura | H04L 45/38 370/231 |

(Continued)

FOREIGN PATENT DOCUMENTS

JP 2008-78893 A 4/2008

*Primary Examiner* — Jeffrey M Rutkowski
*Assistant Examiner* — Andre Tacdiran
(74) *Attorney, Agent, or Firm* — Crowell & Moring LLP

(57) ABSTRACT

A communication system and a network relay device capable of improving failure tolerance are provided. For example, three port switches, fabric switches, and user switches are provided, and two of the port switches configure a multi-chassis link aggregation device. Each of the fabric switches detects the number of the port switches (for example, two switches) connected without failure while logically regarding the port switches configuring the multi-chassis link aggregation device as one switch, and transmits the number of the switches (two switches) from three ports. Each of the port switches sets a link aggregation group for two of the ports which have received the largest number of the switches (two switches).

5 Claims, 12 Drawing Sheets

(56) References Cited

U.S. PATENT DOCUMENTS

| | | | |
|---|---|---|---|
| 2011/0090804 A1* | 4/2011 | Wusirika | H04L 41/0806 370/252 |
| 2011/0222438 A1* | 9/2011 | Wang | H04L 45/123 370/255 |
| 2011/0228767 A1* | 9/2011 | Singla | H04L 49/00 370/389 |
| 2011/0258346 A1* | 10/2011 | Said | H04L 45/00 709/249 |
| 2012/0033541 A1* | 2/2012 | Jacob Da Silva | H04L 45/245 370/217 |
| 2012/0033669 A1* | 2/2012 | Mohandas | H04L 45/245 370/392 |
| 2012/0127853 A1* | 5/2012 | Tatsumi | H04L 49/557 370/217 |

* cited by examiner

LDB

| PORT | SWPID | SLKID | WITH OR WITHOUT FAILURE |
|---|---|---|---|
| P1 | [1] | [1] | WITHOUT |
| P2 | [2] | | WITH |
| P3 | [3] | NONE | WITHOUT |
| ⋮ | ⋮ | ⋮ | ⋮ |

COMMUNICATION SYSTEM AND NETWORK RELAY DEVICE

CROSS-REFERENCE TO RELATED APPLICATION

The present application claims priority from Japanese Patent Application No. 2012-269024 filed on Dec. 10, 2012, the content of which is hereby incorporated by reference into this application.

TECHNICAL FIELD OF THE INVENTION

The present invention relates to a communication system and a network relay device, and relates to a technique effectively applied to, for example, a communication system which uses a technique of link aggregation across switch devices for a part of a system configured of a plurality of switch devices, and to a network relay device included therein.

BACKGROUND OF THE INVENTION

For example, Japanese Patent Application Laid-Open Publication No. 2008-78893 (Patent Document 1) shows a configuration including the pair of the box type switch devices connected to each other via redundancy ports, and the edge switch (box type switch) and the aggregation switch (chassis type switch) which are connected to the pair of box type switch devices. The edge switch is connected to the access port having the same port number in the pair of box type switch devices in the link-aggregation setting state, and the aggregation switch is connected to a network port having the same port number in the pair of box type switch devices in the link-aggregation setting state.

SUMMARY OF THE INVENTION

In recent years, attention to a technique of building a network system by combining a plurality of box type switch devices instead of a chassis type switch device has been paid. The network system is provided with, for example, a plurality of box type switch devices (here, referred to as port switches) for ensuring the necessary number of ports and a plurality of box type switch devices (here, referred to as fabric switches) for mutually connecting the port switches. Each of the port switches is connected to each of the fabric switches by a communication line so that the fabric switches are connected in a star form with reference to one port switch and so that the port switches are also connected in a star form with reference to one fabric switch. In the present specification, such a network system is referred to as a box type fabric system.

In the box type fabric system, for example, one port switch is connected to each of the fabric switches via different communication lines from each other, and a state of a port serving as a connection source of the communication lines can be set to be the link aggregation. When the link aggregation is set, load distribution and redundancy can be achieved within the link aggregation. Therefore, for example, when it is desired to expand a communication band, the communication band can be easily expanded at low cost by additionally installing the fabric switch. Further, in the system, in addition to the expansion of the communication band described above, the number of ports can be easily expanded at low cost by additionally installing the port switch. As a result, by using this system, a flexible system in accordance with user requirement can be built at low cost compared with a case that the system configured of the chassis type switch device is used.

Note that, in the box type fabric system, for example, when failure occurs in the communication line and/or the fabric switch, the redundancy can be ensured by the function of the above-described link aggregation. However, when failure occurs in the port switch, it is difficult to ensure the redundancy in some cases. Meanwhile, for example, as similar to Patent Document 1, there is a method for achieving the device redundancy by mutually connecting two box type switch devices and setting, for example, states of access ports of the two box type switch devices having the same port number to be the link aggregation. In the present specification, this method is referred to as multi-chassis link aggregation.

The present inventor and others have paid attention to these advantages, and have studied the achievement of the redundancy of the port switches (improvement in failure (fault) tolerance) etc. by combining the multi-chassis link aggregation to the above-described box type fabric system. As a result, it has been found out that, when failure occurs in a communication path between the port switch and the fabric switch, a trouble occurs in the setting of the communication path, and the failure tolerance cannot be improved in some cases.

The present invention has been made in consideration of such circumstances, and one of the preferred aims of the present invention is to provide a communication system and a network relay device in which the failure tolerance can be improved. The above and other preferred aims and novel characteristics of the present invention will be apparent from the description of the present specification and the accompanying drawings.

The typical embodiment summary of the inventions disclosed in the present application will be briefly described as follows.

A communication system of the present embodiment has: a plurality of port switches including first and second port switches; a plurality of fabric switches building a communication path between the plurality of port switches; and a user switch connected to the first and second port switches via different communication lines from each other, the user switch setting link aggregation for ports serving as connection sources thereof. The plurality of port switches are connected to the plurality of fabric switches via different communication lines from each other, respectively. The first and second port switches are set in a same domain group, the first and second port switches comprise redundancy ports, and the redundancy port of the first port switch is connected to the redundancy port of the second port switch via a common communication line. Here, each of the plurality of fabric switches detects the number of port switches corresponding to a communication path having no failure from the communication paths to the plurality of port switches while logically regarding the first and second port switches as one switch, and transmits the detected number of port switches to each of the plurality of port switches. Each of the plurality of port switches receives the number of port switches detected from each of the plurality of fabric switches, and sets link aggregation for single or plurality of ports which have received the largest number of port switches.

In the invention disclosed in the present application, an effect obtained by the typical embodiment will be simply explained as achievement of improvement in failure tolerance.

BRIEF DESCRIPTIONS OF THE DRAWINGS

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout all drawings for describing the embodiments, and the repetitive description thereof will be omitted.

First, prior to explanation of a communication system according to the present embodiment, matters studied as a premise thereof will be described by using FIGS. 9 to 11.

<<Summary of Box Type Fabric System>>

Figure 9:
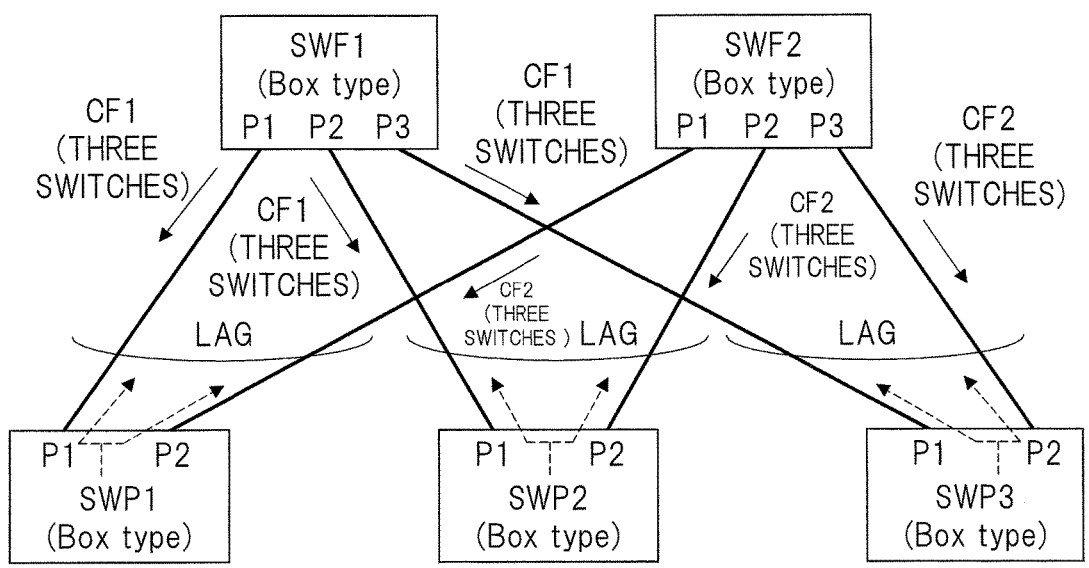
FIG. 9 is a schematic diagram illustrating a configuration example of a box type fabric system studied as a premise of the present invention.

FIG. 9 is a schematic diagram illustrating a configuration example of a box type fabric system studied as the premise of the present invention. As illustrated in FIG. 9, the box type fabric system is provided with a plurality of (in this case, three) port switches SWP1 to SWP3 and a plurality of (in this case, two) fabric switches SWF1 and SWF2. Each of SWP1 to SWP3, SWF1, and SWF2 is configured of a box type switch device. The switches SWF1 and SWF2 build communication paths among SWP1 to SWP3.

The port switches SWP1 to SWP3 are connected to the fabric switches SWF1 and SWF2 via different communication lines from each other, respectively. That is, a port P1 and a port P2 of the SWP1 are connected to a port P1 of the SWF1 and a port P1 of the SWF2 via the different communication lines from each other, respectively. Also, a port P1 and a port P2 of the SWP2 are connected to a port P2 of SWF1 and a port P2 of SWF2 via different communication lines from each other, respectively. Similarly, a port P1 and a port P2 of SWP3 are connected to a port P3 of SWF1 and a port P3 of SWF2 via different communication lines from each other, respectively. Each of the port switch and the fabric switch is configured of, for example, the box type switch device having the same structure as each other although not particularly limited, and can be set to function as either the port switch or the fabric switch by the internal setting thereof.

In the box type fabric system, each of the port switches (for example, SWP1) is connected to the plurality of fabric switches SWF1 and SWF2 via a plurality of (here, two) communication lines, and the link aggregation can be set for the ports P1 and P2 serving as the connection sources thereof. In the present specification, an aggregation of ports (here, P1 and P2) for which the link aggregation is set is referred to as a link aggregation group "LAG". When the link aggregation (link aggregation group LAG) is set, the load distribution can be achieved within the group LAG. For example, when a frame is to be transmitted from the port switch SWP1 toward the port switch SWP3, the frame is appropriately distributed based on a predetermined rule to a communication path which is from the port P1 of the SWP1 toward the SWP3 via the SWF1 and a communication path which is from the port P2 of the SWP1 toward the SWP3 via the SWF2.

As the predetermined rule, for example, a method of computing by using header information in the frame is cited although not particularly limited. More specifically, a MAC (Media Access Control) address of a transmission source and/or an address, and besides, an IP (Internet Protocol) address of a transmission source and/or an address etc. in the header information are used. Note that the ports for which the link aggregation group LAG is set are functioned as one port logically (virtually). Therefore, such a signal return as flooding of a broadcast frame, which has been received by the port P1 of the port switch SWP1, from the port P2 of the SWP1 does not occur.

Here, the above-described link aggregation group LAG can be set as, for example, follows. First, each of the fabric switches SWF1 and SWF2 detects the number of the port switches connected thereto without the failure, and transmits a control frame CF1 containing the detected number of the switches from all the ports P1 to P3. In this example, the SWF1 transmits the control frame CF1 containing "three switches" from all the ports P1 to P3 since the three port switches SWP1 to SWP3 are connected thereto without the failure. Similarly, the SWF2 also transmits a control frame CF2 containing "three switches" from the P1 to P3 since the SWP1 to SWP3 are connected thereto without the failure.

Subsequently, the port switch SWP1 receives the control frame CF1, which has been transmitted from the fabric switch SWF1, at the port P1, and receives the control frame CF2, which has been transmitted from the fabric switch SWF2, at the port P2. The SWP1 recognizes the largest number of the switches from among the numbers of switches contained in the received control frame, and sets the link aggregation group LAG for the ports which have received the largest number of the switches. In this example, the SWP1 sets the LAG for the P1 which ha received the CF1 and for the P2 which has received the CF2 since both of the CF1 and the CF2 contain "three switches". The same also goes for the SWP2 and the SWP3 so that each of the SWP2 and the SWP3 sets LAG for the ports P1 and P2.

<<Combination of Box Type Fabric System and Multi-Chassis Link Aggregation>>

Figure 10:
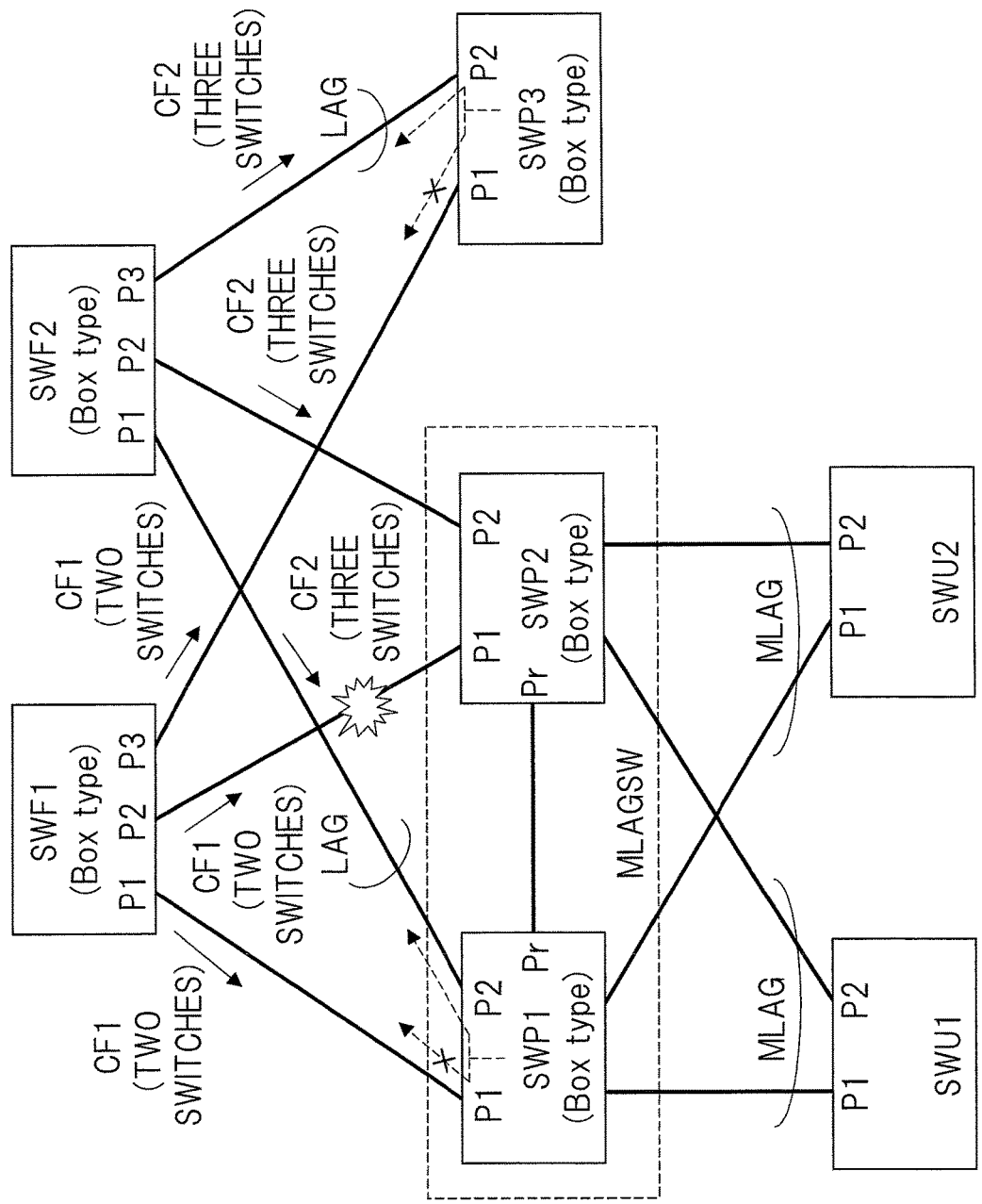
FIG. 10 is a schematic diagram illustrating a configuration example in a case that multi-chassis link aggregation is applied to the box type fabric system of FIG. 9, and besides, explaining an example of a problem thereof.
Figure 11:
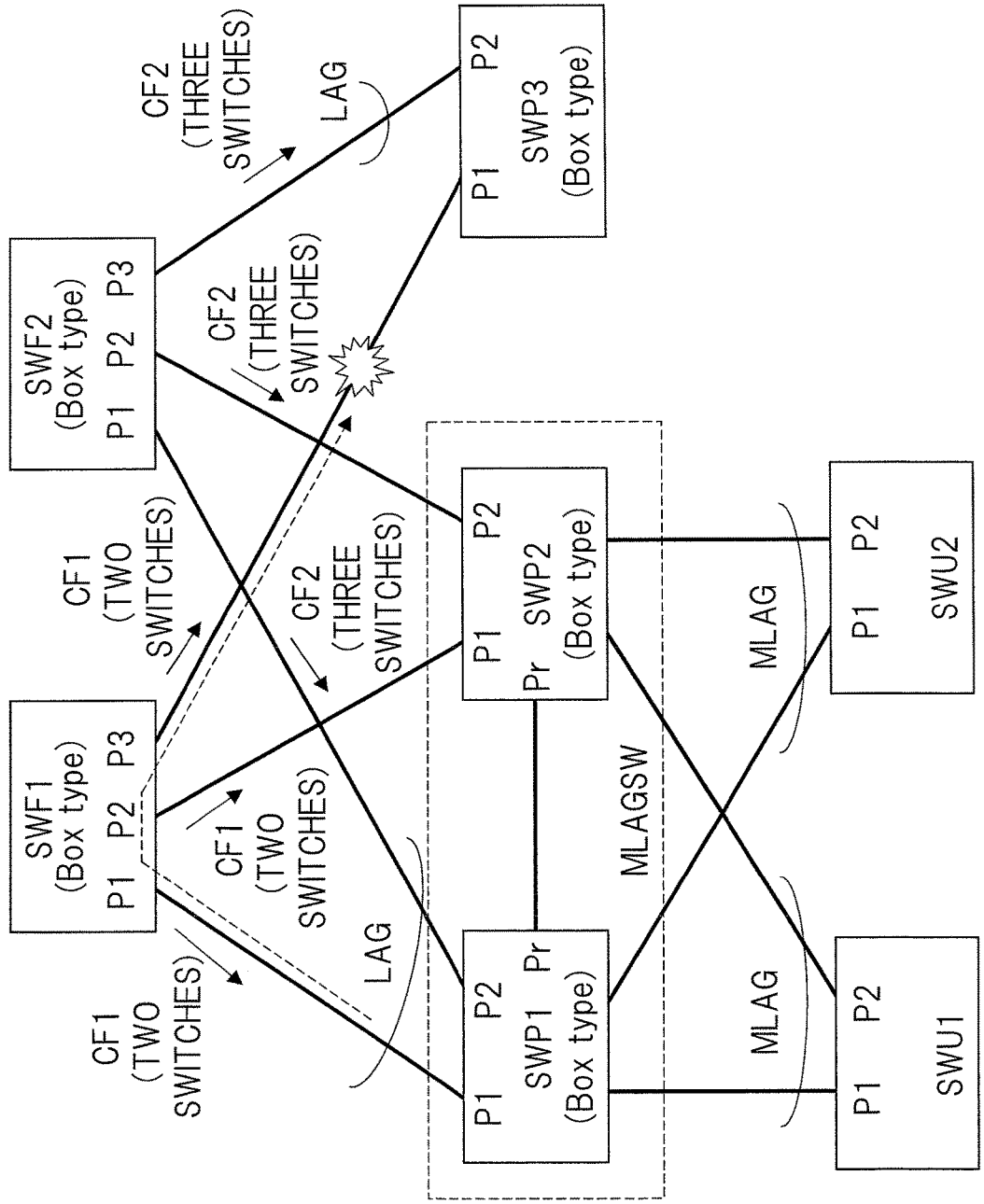
FIG. 11 is a diagram explaining an example of a different problem from that of FIG. 10.
Figure 12:
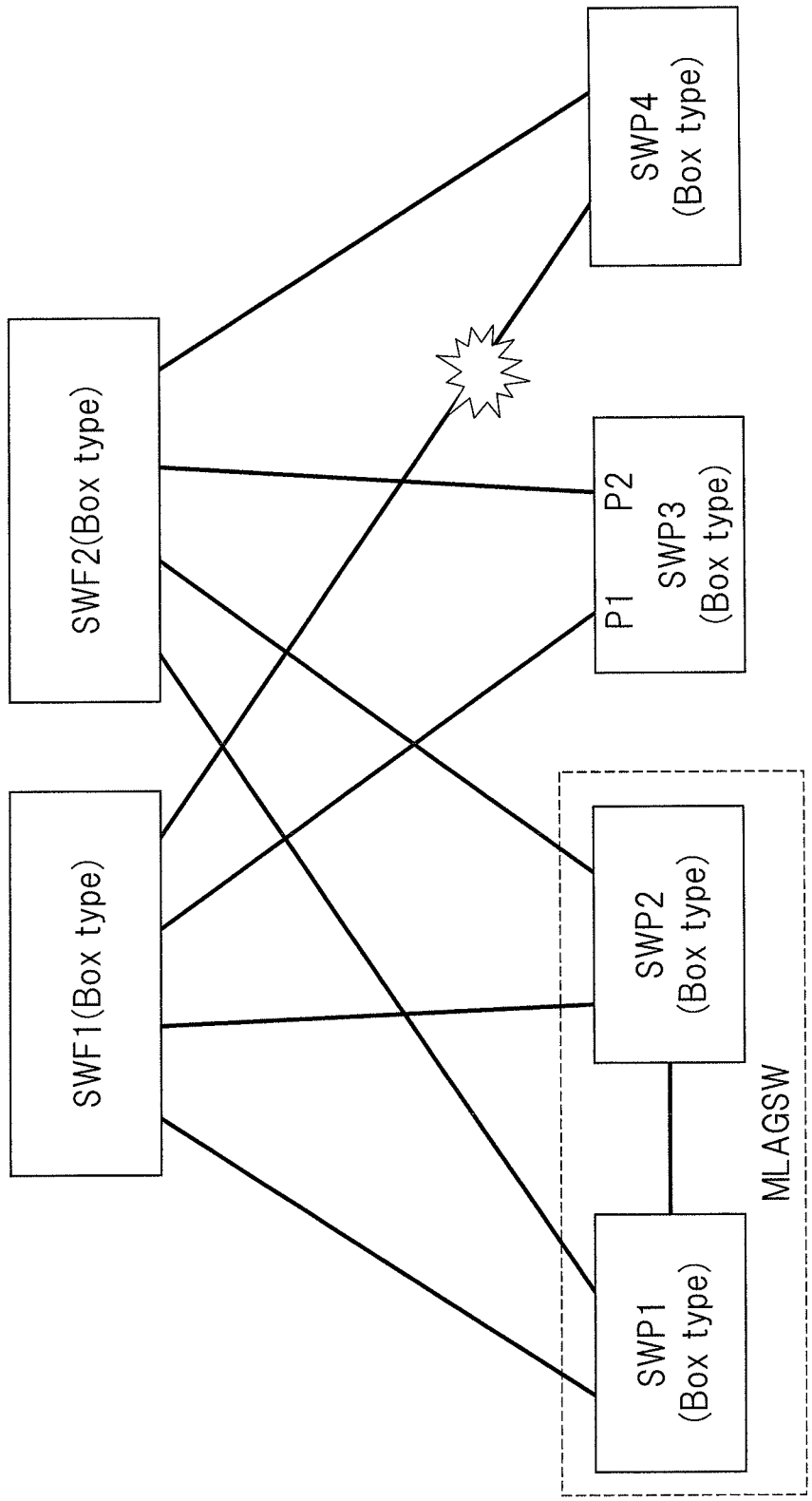
FIG. 12 is a supplementary diagram for FIGS. 10 and 11.

FIGS. 10 and 11 are schematic diagrams illustrating a configuration example in a case that the multi-chassis link aggregation is applied to the box type fabric system of FIG. 9, and besides, explaining an example of problems thereof. FIG. 12 is a supplementary diagram of FIGS. 10 and 11. In FIG. 10, each of the port switch SWP1 and the port switch SWP2 is provided with a redundancy port Pr in addition to the configuration example of FIG. 9, and the multi-chassis link aggregation is set for the SWP1 and the SWP2 by connecting the above-described ports Pr of the SWP1 and the SWP2 to each other by a common communication line. In the present specification, the SWP1 and the SWP2 for which the multi-chassis link aggregation is set are referred to as a multi-chassis link aggregation device "MLAGSW".

Further, in FIG. 10, user switches SWU1 and SWU2 are connected to the SWP1 and the SWP2 configuring the multi-chassis link aggregation device MLAGSW. The user switch SWU1 is connected to the port switches SWP1 and SWP2 via different communication lines from each other, and sets the link aggregation for the ports P1 and P2 serving as the connection sources of these communication lines. In the present specification, the ports (the P1 and the P2 of the SWU1) serving as the connection sources of the link aggregation which has been set across the two switch devices (SWP1 and SWP2) as described above are referred to as the multi-chassis link aggregation group MLAG. The SWU1 sets the MLAG for the P1 and the P2. The user switch SWU2 is similarly connected to the SWP1 and the SWP2 via different communication lines from each other, and sets the MLAG for the ports P1 and P2 serving as the connection sources of these communication lines.

The frame transmitted from the user switch SWU1 is appropriately distributed and transmitted to either the port P1 side or the port P2 side of the SWU1 based on a predetermined rule in accordance with the multi-chassis link aggregation. Similarly, the frame transmitted from the user switch SWU2 is also appropriately distributed and transmitted to either the port P1 side or the port P2 side of the SWU2 based on a predetermined rule. The port switches SWP1 and SWP2 configuring the multi-chassis link aggregation device MLAGSW transmit/receive, for example, statuses themselves, information of an address table (FDB: Forwarding DataBase), etc. between the redundancy ports Pr so as to be logically (virtually) functioned as one switch. By using such multi-chassis link aggregation, the failure tolerance is improved in addition to improvement of the communication band caused by the load distribution. For example, even if the failure occurs in the SWP1, the frames transmitted from the SWU1 and the SWU2 can be aggregated and transferred to the SWP2 side.

Here, as illustrated in FIG. 10, for example, a case that the failure occurs in the communication path (the communication line or the port of the connection source thereof) between the port switch SWP2 and the fabric switch SWF1 is assumed. In this case, if the method of setting the link aggregation as described in FIG. 9 is used, the SWF1 recognizes the number of the port switches connected without the failure as two (SWP1 and SWP3) as a result of the failure, and transmits a control frame CF1 containing the "two switches" from all the ports (or all the ports without the failure P1 and P3).

The control frame CF1 transmitted from the SWF1 contains "two switches", and the control frame CF2 transmitted from the fabric switch SWF2 contains "three switches", and therefore, the port switch SWP3 sets the link aggregation group LAG for the port P2 which has received the CF2 containing the largest number of the switches, and besides, eliminates the port P1 which has received the CF1 from the LAG. The port for which the LAG is set means a normal port, and therefore, the SWP3 can transmit the frame from only the port P2. Although the LAG is set for the P2 of the SWP3 in the example of FIG. 10, note that this is strictly not referred to as LAG because the number of the ports for which the LAG is set is one. However, in the present specification, this will be also referred to as LAG for the sake of convenience hereinafter. For example, in a case that a fabric switch (assumed to be SWF3) is further provided although not illustrated, the SWP3 is also provided with a port (assumed to be P3) in accordance with this, and the SWP3 sets the LAG for the P2 and the P3 in this case.

If the port switches SWP1 and SWP2 do not configure the multi-chassis link aggregation device MLAGSW in FIG. 10, there is no particular problem even if the port for which the link aggregation group LAG is set in the port switch SWP3 is only the P2 as described above. That is, the communications among the SWP1 to the SWP3 via the fabric switch SWF1 are partially disabled due to the failure, and therefore, this case can be practically handled as similar to a case that the failure occurs in the SWF1 itself.

However, in the case that the port switches SWP1 and SWP2 configure the multi-chassis link aggregation device MLAGSW, this MLAGSW is logically (virtually) functioned as one switch. In this case, logically, this one MLAGSW and the SWF1 are connected to each other via the two communication lines (the communication line between the SWP1 and the SWF1 and the communication line between the SWP2 and the SWF1), and it is required to function the ports serving as the connection sources of these two communication lines as the LAG (MLAG). It is required to make the P1 and the P2 of the SWF1 function as the LAG (MLAG), and it is also required to make the P1 of the SWP1 and the P1 of the SWP2 function as the LAG (MLAG).

Therefore, it is required to maintain the communication path via the SWF1 as long as the failure does not occur in both of the two communication lines between the multi-chassis link aggregation device MLAGSW and the fabric switch SWF1 even if the failure as illustrated in FIG. 10 occurs. That is, it is required that the port P1 of the port switch SWP3 remains in the link aggregation group LAG. Also, as similar to the case of the port switch SWP3, the port switch SWP1 also receives "two switches" from the port 21 and "three switches" from the port P2. Therefore, if the method of setting the link aggregation as described in FIG. 9 is applied as it is, the port P1 is eliminated from the LAG although this port is not originally supposed to be eliminated therefrom. Therefore, between the SWP1 and the SWP3, the communication path via the SWF1 which is originally supposed to be set to be enabled is set to be disabled bi-directionally.

Accordingly, as an example of a countermeasure for this, it is conceivable to provide such a function (assumed to be a function A) that the link aggregation group LAG is set also for the port which has received the number of the switches that is one less than the largest number of the switches for the port switches SWP1 and SWP2 configuring the multi-chassis link aggregation device MLAGSW. In this manner, the port P1 of the SWP1 can remain without being eliminated from the LAG. However, in this case, there is another problem as illustrated in FIG. 11.

In FIG. 11, in a configuration example as similar to that of FIG. 10, the failure occurs in the communication path (communication line or the port of the connection source thereof) between the port switch SWP3 and the fabric switch SWF1. In this case, as similar to the case of FIG. 10, the port switch SWP1 receives "two switches" from the port P1 and "three switches" from the port P2. However, in this case, the frame cannot be practically transmitted from the SWP1 to the SWP3 via the SWF1, and therefore, it is required to eliminate the port P1 from the link aggregation group LAG without using the function A as described in FIG. 10. That is, in the multi-chassis link aggregation device MLAGSW, it is required to appropriately set the link aggregation group LAG so as to distinguish the case that the failure has occurred in the communication line connected to the MLAGSW as illustrated in FIG. 10 and the case that the failure has occurred in the communication line other than that as illustrated in FIG. 11.

Here, even if the link aggregation group LAG can be appropriately set in the multi-chassis link aggregation device MLAGSW, it is not still easy to appropriately set the LAG in the port switch SWP3. For example, the port switch SWP1 can recognize that the port switch itself belongs to the MLAGSW, and therefore, it is possible for the port switch SWP1 to use the above-described function A with distinction (that is, with distinguishing the case that the failure has occurred in the communication line connected to the MLAGSW from the case that the failure has occurred in the communication line other than that). On the other hand, in an example of a case that a port switch SWP4 is further provided as illustrated in FIG. 12, it is not easy for the SWP3 to distinguish the case that the failure has occurred in the communication lines connected to the MLAGSW (SWP1, SWP2) and the case that the failure has occurred in the communication line other than that between the SWP4 and the SWF1. That is, in the SWP3, it is required to remain the port P1 in the LAG in the case of FIG. 10, and it is required to eliminate the P1 from the LAG in the case of FIG. 12. However, means for distinguishing them is not provided.

<<Configuration and Operation of Communication System According to Present Embodiment>>

Figure 1:
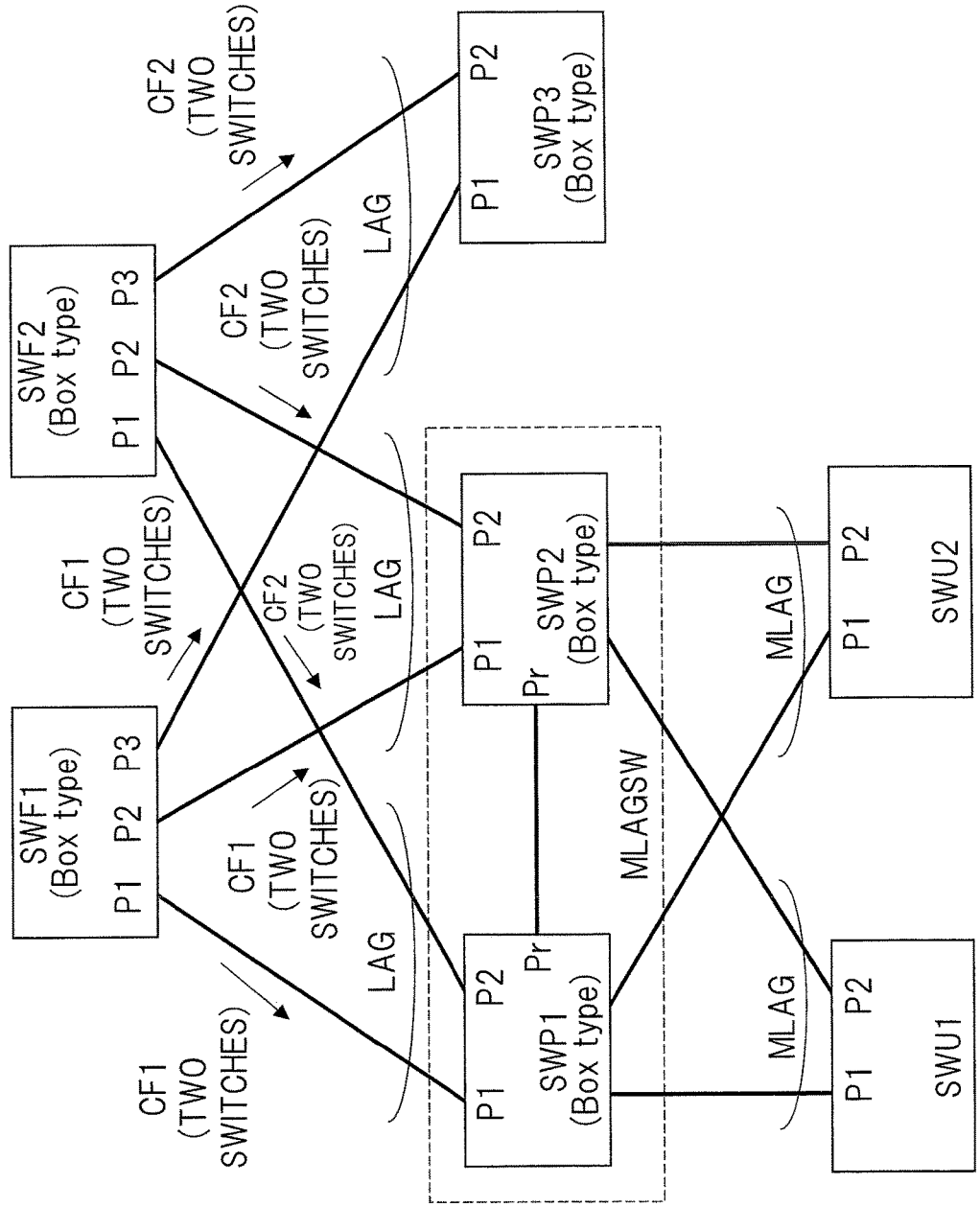
FIG. 1 is a schematic diagram illustrating a configuration example and a principal operation example of a communication system according to an embodiment of the present invention.

FIG. 1 is a schematic diagram illustrating a configuration example and a principal operation example of a communication system according to an embodiment of the present invention. The communication system illustrated in FIG. 1 is provided with a configuration as similar to that of FIG. 10 described above including a plurality of (here, two) fabric switches SWF1 and SWF2, a plurality of (here, three) port switches SWP1 to SWP3, and user switches SWU1 and SWU2. Each of the SWF1, the SWF2, and the SWP1 to the SWP3 is a network relay device. As described above, each of the SWF1, the SWF2, and the SWP1 to the SWP3 is configured of the box type switch device, and the switches configure the box type fabric system as a whole. Also, the multi-chassis link aggregation (in other words, a group of the same domain) is set for the SWP1 and the SWP2, the redundancy ports Pr are connected to each other via the common connection line, so that the SWP1 and the SWP 2 are logically (virtually) functioned as one switch device (in other words, the multi-chassis link aggregation device MLAGSW).

The port switch SWP1 is connected to the fabric switches SWF1 and SWF2 via different communication lines from each other. Similarly, each of the SWP2 and the SWP3 is connected to the SWF1 and the SWF2 via different communication lines from each other. The user switch SWU1 is connected to the SWP1 and the SWP2 via different communication lines from each other, and the multi-chassis link aggregation group MLAG is set for the ports P1 and P2 serving as connection sources of these communication lines. Similarly, the user switch SWU2 is also connected to the SWP1 and the SWP2 via different communication lines from each other, and the MLAG is set for the ports P1 and P2 serving as connection sources of these communication lines.

The fabric switches SWF1 and SWF2 build communication paths among the port switches SWP1 to SWP3. For example, the SWF1 detects the destination MAC address of the frame transferred from the SWP1, and, if the MAC address and the port P3 are associated with each other in an address table (FDB) of its own, the SWF1 transfers the frame from the P3 to the SWP3. At this time, practically, for example, while the SWP1 receives the frame transmitted from a terminal (such as a server) connected to the user switch SWU1 although not illustrated via the SWU1 and transfers the frame to the SWF1, the SWP3 transfers the frame, which has been transferred from the SWF1, to a terminal (such as a server) connected to itself although not illustrated.

In such a configuration, as described in FIG. 9, when the fabric switch SWF1 detects the number of the port switches corresponding to the communication paths without the failure from among the communication paths between the ports P1 to P3 and the port switches SWP1 to SWP3, the fabric switch SWF1 detects the number of the switches so that the SWP1 and the SWP2 are logically (virtually) regarded as one switch. That is, the SWF1 counts one multi-chassis link aggregation device MLAGSW for the number of the two switches SWP1 and SWP2 for which the same multi-chassis link aggregation (domain group) is set. Then, the SWF1 transmits the detected number of the switches to each of the SWP1 to the SWP3.

More specifically, the fabric switch SWF1 previously detects whether the failure occurs in the communication paths to the port switches SWP1 and SWP2 or not, and counts zero switch for the MLAGSW (SWP1 and SWP2) if the failure occurs in all of the communication paths, or counts one switch for the MLAGSW (SWP1 and SWP2) otherwise. In this example, the SWF1 counts one switch for the MLAGSW if the failure occurs in only one of the communication paths between the SWF1 and the SWP1 and between the SWF1 and the SWP2 and if no failure occurs in both of them. Similarly, the fabric switch SWF2 also counts zero switch for the MLAGSW if the failure occurs in all of the communication paths between the SWF2 and the SWP1 and between the SWF2 and the SWP2, or counts one switch for the MLAGSW otherwise.

As a result, if no failure occurs in each of the communication paths as illustrated in FIG. 1, the fabric switch SWF1 counts one switch for the MLAGSW (SWP1 and SWP2) and one port switch SWP3, so that the number is totally detected as two. Similarly, the fabric switch SWF2 also detects two. Then, the SWF1 transmits the control frame CF1 containing the detected number "two switches" to each of the SWP1 to the SWP3, and the SWF2 also transmits the control frame CF2 containing the detected number "two switches" to each of the SWP1 to the SWP3.

Meanwhile, the port switches SWP1 and SWP2 receive the control frames CF1 and CF2 from the fabric switches SWF1 and SWF2, respectively, and extract the number of the switches (here, two in both of them) therefrom. In this manner, the SWP1 and the SWP2 set the link aggregation group LAG for the ports P1 and P2 which have received the largest number of the switches (here, two switches). The port for which the LAG is set is handled as the normal port, and the load distribution and others is appropriately performed within the LAG as described in FIG. 9.

Figure 2:
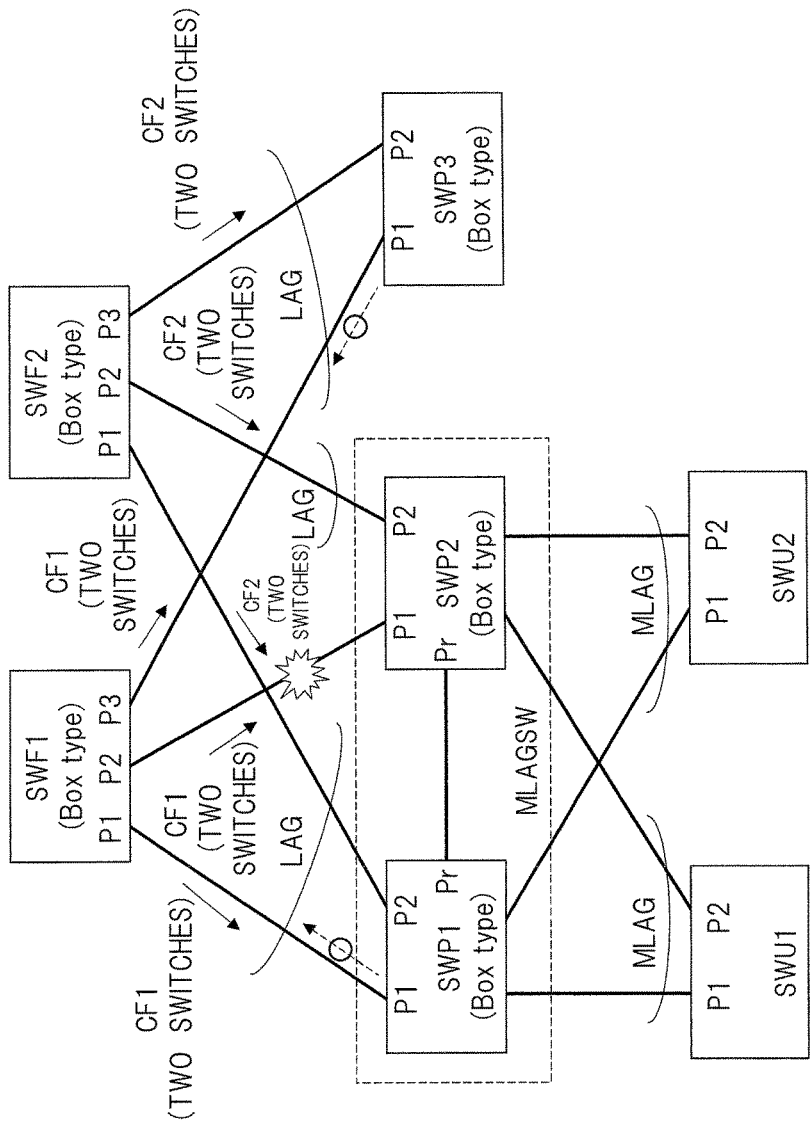
FIG. 2 is a schematic diagram illustrating a principal operation example of the communication system of FIG. 1 in a case of a communication path with failure.

FIG. 2 is a schematic diagram illustrating a principal operation example of the communication system of FIG. 1 in the case that the failure occurs in the communication path. In FIG. 2, as similar to the case of FIG. 10, the failure occurs in the communication path (communication line or the port of the connection source thereof) between the port switch SWP2 and the fabric switch SWF1. In this case, the failure occurs in only one of the communication paths between the fabric switch SWF1 and the port switches SWP1 and SWP2 for which the multi-chassis link aggregation (domain group) is set, and therefore, the fabric switch SWF1 counts one switch for the MLAGSW (SWP1 and SWP2). Then, the SWF1 totally detects two switches counted so as to add one port switch SWP3 to the above-described one switch, and transmits the control frame CF1 containing "two switches" to each of the SWP1 to SWP3 (or the SWP1 and the SWP3).

Since no failure occurs in both of the communication paths between the fabric switch SWF2 and the port switches SWP1 and SWP2 for which the multi-chassis link aggregation (domain group) is set, the fabric switch SWF2 counts one switch for the MLAGSW (SWP1 and SWP2). Then, the SWF2 totally detects two switches counted so as to add one port switch SWP3 to the above-described one switch, and transmits the control frame CF2 containing "two switches" to each of the SWP1 to SWP3.

The port switches SWP1 and SWP2 receive the control frames CF1 and CF2 from the fabric switches SWF1 and SWF2, respectively, and extract the number of the switches (here, two in both of them) therefrom. In this manner, the SWP1 and the SWP2 set the link aggregation group LAG for the ports P1 and P2 which have received the largest number of the switches (here, two switches). On the other hand, the port switch SWP2 extracts "two switches" from the CF2 which has been transmitted from the SWF2 whereas the port switch SWP2 does not receive the control frame CF1 containing the number of the switches from the SWF1 due to the failure, and therefore, the port switch SWP2 sets the LAG for the port P2 which has received the largest number of the switches (here, two switches), and eliminates the port P1 from the LAG. As a result, as different from the case of FIG. 10, between the SWP1 and the SWP3, the communication paths via the SWF1 can be set to be enabled bi-directionally.

Figure 3:
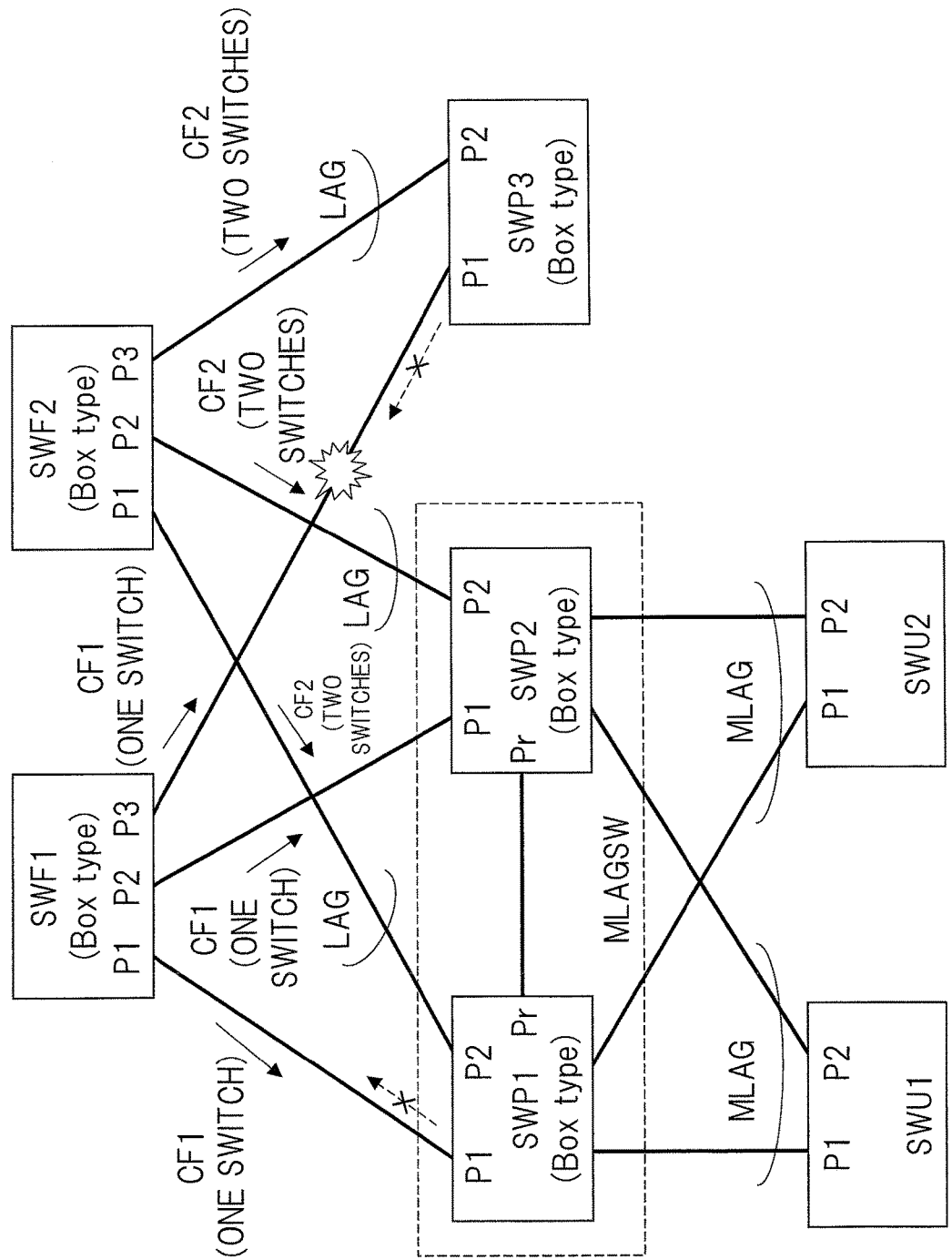
FIG. 3 is a schematic diagram illustrating a principal operation example of the communication system of FIG. 1 in a case of a communication path with different failure from that of FIG. 2.

FIG. 3 is a schematic diagram illustrating a principal operation example of the communication system of FIG. 1 in the case that the different failure from FIG. 2 occurs in the communication path. In FIG. 3, as similar to the case of FIG. 11, the failure occurs in the communication path (communication line or the port of the connection source thereof) between the port switch SWP3 and the fabric switch SWF1. In this case, no failure occurs in both of the communication paths between the fabric switches SWF1, SWF2 and the port switches SWP1, SWP2 for which the multi-chassis link aggregation (domain group) are set, and therefore, the fabric switches SWF1, SWF2 count one switch for the MLAGSW (SWP1 and SWP2).

Since the failure occurs in the communication path between the fabric switch SWF1 and the port switch SWP3, the fabric switch SWF1 detects only one switch obtained by the MLAGSW (the port switches SWP1 and SWP2), and transmits the control frame CF1 containing "one switch" to each of the SWP1 to the SWP3 (or the SWP1 and the SWP2). The fabric switch SWF2 totally detects two switches counted by adding one SWP3 to one switch obtained by the MLAGSW (SWP1 and SWP2), and transmits the control frame CF2 containing "two switches" to each of the SWP1 to the SWP3.

The port switches SWP1 and SWP2 receive the control frames CF1 and CF2 from the fabric switches SWF1 and SWF2, and extract "one switch" from the CF1 and "two switches" from the CF2, respectively. In this manner, the SWP1 and the SWP2 set the link aggregation group LAG for the port P2 which has received the largest number of the switches (here, two switches), and eliminates the port P1 from the LAG. And, the port switch SWP3 extracts "two switches" from the CF2 which has been transmitted from the SWF2 whereas the port switch SWP3 does not receive the control frame CF1 containing the number of the switches from the SWF1 due to the failure. Therefore, the SWP3 sets the LAG for the port P2 which has received the largest number of the switches (here, two switches), and eliminates the port P1 from the LAG. As a result, as different from the case of FIG. 11, the communication path from the SWP3 to the SWP1 via the SWF1 and besides, a reverse-direction communication path can be set to be disabled.

As described above, when the communication system of FIG. 1 is used, the failure tolerance can be improved by the device redundancy obtained by the application of the multi-chassis link aggregation, and besides, trouble in the setting of the link aggregation that can be caused by the application can be solved, so that the failure tolerance can be further improved. Note that FIG. 1 illustrates the configuration example provided with the three port switches SWP1 to SWP3 and the two fabric switches SWF1 and SWF2. However, obviously, the configuration is not limited to this, and the numbers of the port switches and fabric switches can be appropriately changed. Also, the number of the multi-chassis link aggregation device MLAGSW can be a plural number. For example, in the configuration example of FIG. 12, if the multi-chassis link aggregation is set also for the SWP3 and the SWP4, each of the SWF1 and the SWF2 can logically count one switch for the SWP3 and the SWP4 as similar to the SWP1 and the SWP2.

<<Other Function of Communication System According to Present Embodiment>>

Figure 4:
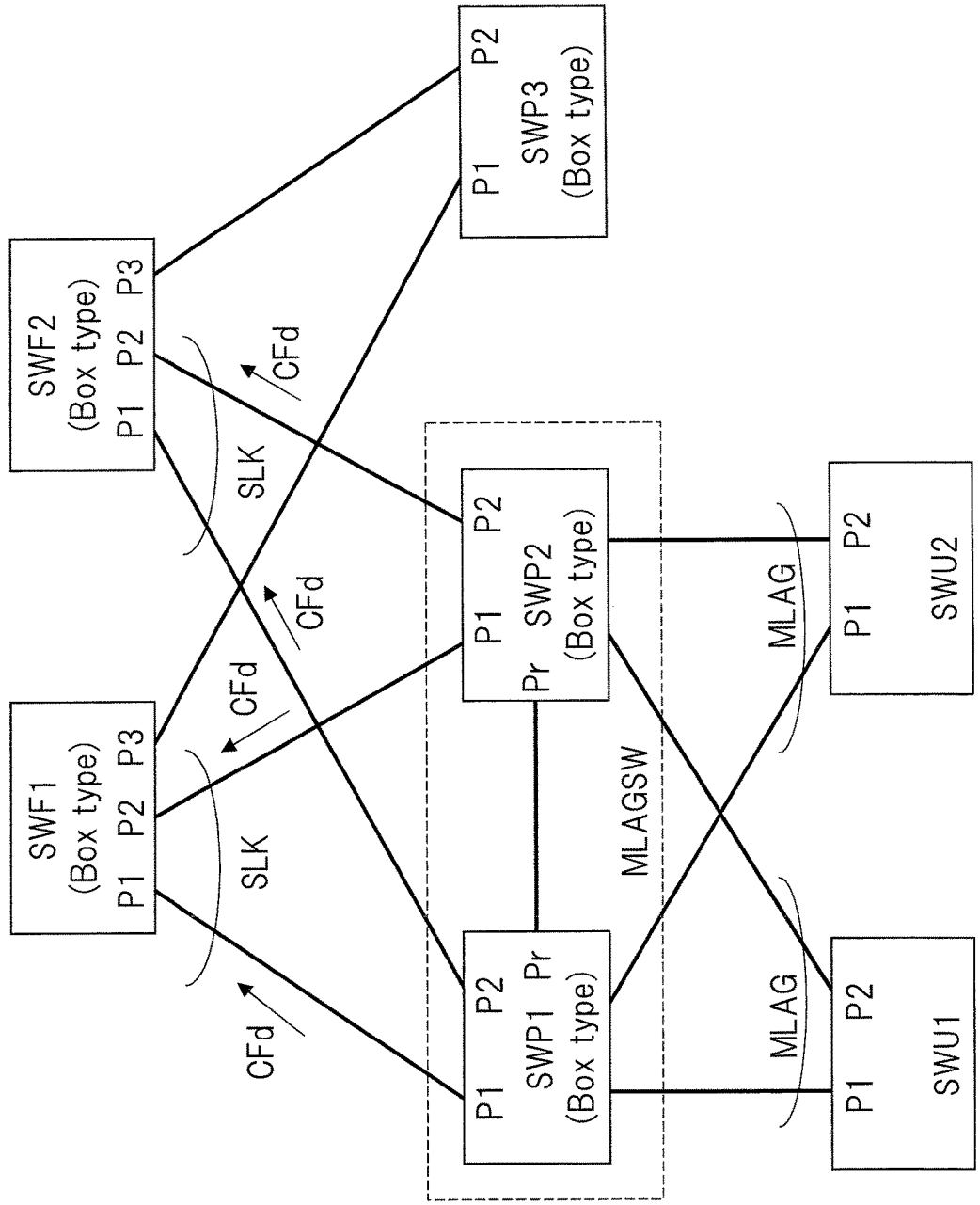
FIG. 4 is an explanatory diagram illustrating a schematic operation example of a domain recognizing function which is an example of functions provided in the communication system of FIG. 1.

FIG. 4 is an explanatory diagram illustrating a schematic operation example of a domain recognizing function serving as an example of the functions provided in the communication system of FIG. 1. As described in FIG. 1, in order to logically count one multi-chassis link aggregation device MLAGSW (the port switches SWP1 and SWP2) by the fabric switches SWF1 and SWF2, it is required to previously recognize the presence of this MLAGSW. This recognition can be achieved by, for example, in the SWF1 and the SWF2, previously manually setting the information of the connection of the MLAGSW to the ports P1 and P2. However, it is more desirable to achieve the recognition by automatic setting.

Accordingly, FIG. 4 illustrates an example of a method for the achievement by the automatic setting. In FIG. 4, for example, the same domain identifier indicating that the same domain group is set for itself is previously maintained in the two port switches SWP1 and SWP2 configuring the multi-chassis link aggregation device MLAGSW. In this state, each of the SWP1 and the SWP2 generates a control frame CFd containing the domain identifier, and transmits the frame to each of the fabric switches SWF1 and SWF2 connected to themselves.

When the fabric switches SWF1 and SWF2 receive the control frame CFd containing the same domain identifier, a sub link "SLK" is set for the receiving ports P1 and P2. Each of the SWF1 and the SWF2 recognizes that the same domain group (multi-chassis link aggregation) is set for the ports P1 and P2 for which the SLK is set and the port switches SWP1 and SWP2 connected beyond them. Note that the ports for which the SLK is set are functioned as one port logically (virtually).

When the fabric switches SWF1 and SWF2 are automatically caused to recognize the presence of the multi-chassis link aggregation device MLAGSW, maintenance/management etc. can be made easier than, for example, the case of the manual setting. For example, even if a fabric switch is further added, the fabric switch can automatically recognize the presence of the MLAGSW.

<<Outline of Fabric Switch (Network Relay Device)>>

Figures 5A, 5B:
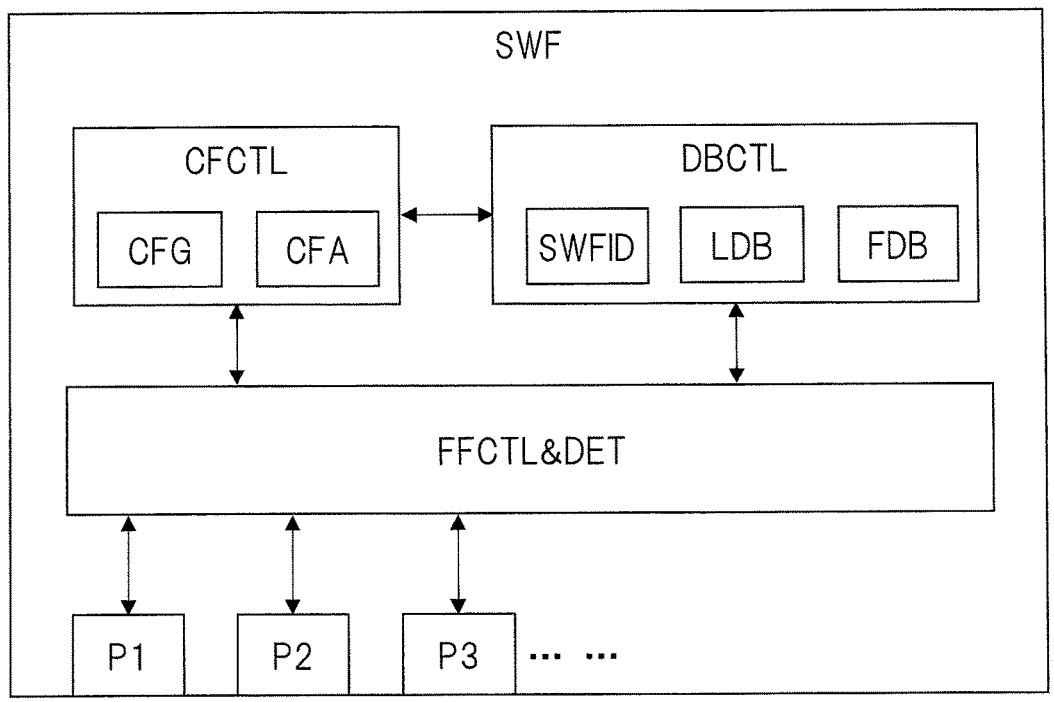
FIG. 5A is a block diagram illustrating a schematic configuration example of a principal part of a fabric switch of the communication system of FIG. 1.
FIG. 5B is an explanatory diagram illustrating an example of retained contents retained in a link table of FIG. 5A.
Figure 6:
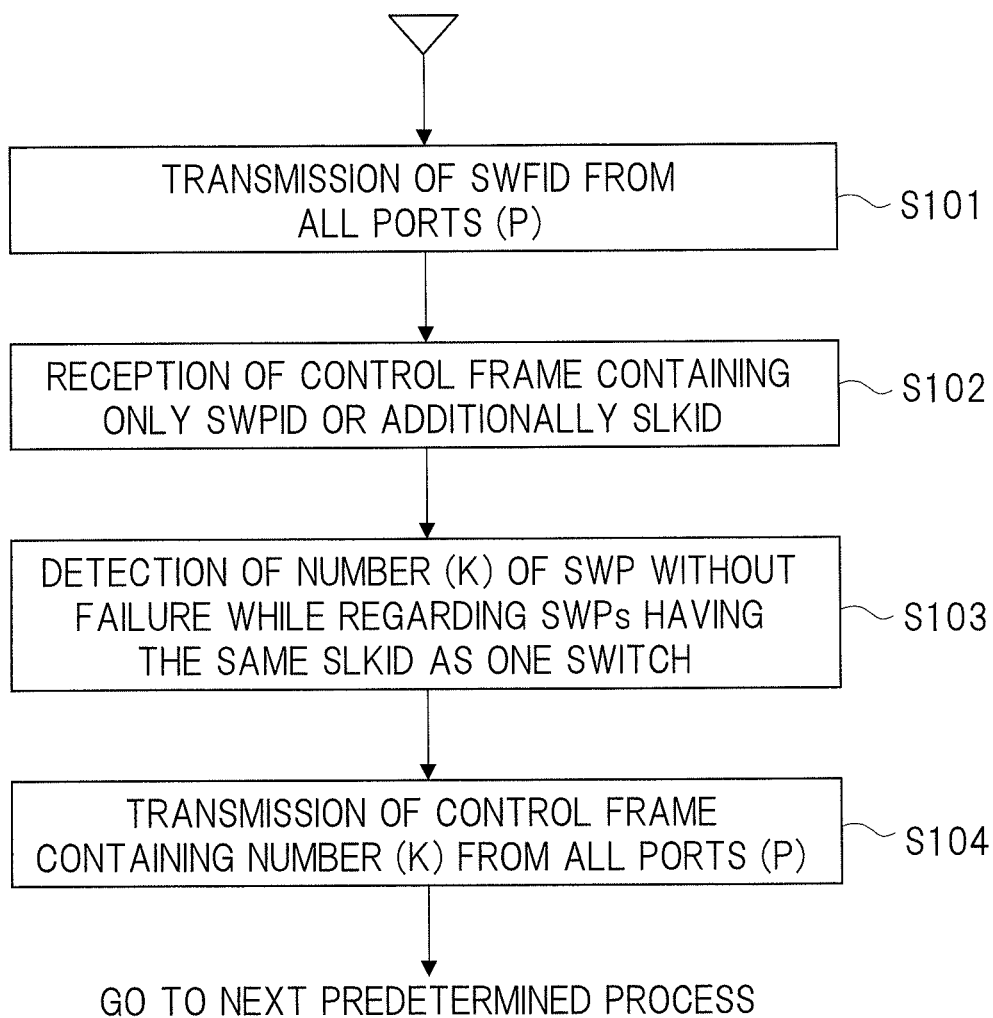
FIG. 6 is a flowchart illustrating a principal operation example of the fabric switch in FIGS. 5A and 5B.

FIG. 5A is a block diagram illustrating a schematic configuration example of a principal part of the fabric switch of the communication system of FIG. 1, and FIG. 5B is an explanatory diagram illustrating an example of retention contents retained by a link table of FIG. 5A. FIG. 6 is a flowchart illustrating a principal operation example of the fabric switch of FIGS. 5A and 5B. A fabric switch (network relay device) SWF illustrated in FIG. 5A is provided with, for example, a frame-transfer control unit FFCTL, a failure detecting unit DET, a control-frame managing unit CFCTL, a database managing unit DBCTL, a plurality of ports (P1, P2, P3, and so on), etc. The ports P1, P2, P3, and so on are ports for port switches, and the port switches SWP1, SWP2, and SWP3 are connected to the P1, the P2, and the P3 when the SWF1 of FIG. 1 is exemplified. Note that the three ports P1, P2, and P3 for the port switches are representatively illustrated here. However, when four or more port switches are provided, four or more ports are correspondingly provided.

The control-frame managing unit CFCTL is provided with a control-frame generating unit CFG and a control-frame analyzing unit CFA, and appropriately manages them. The CFG generates various control frames, and transmits the generated control frame from each of the ports (P1, P2, P3, and so on) via the frame-transfer control unit FFCTL. The CFA analyzes (determines) a content of the control frame for the control frame received by the FFCTL via each of the ports (P1, P2, P3, and so on) (that is, the control frame transmitted by each of the port switches). The control frame is a management frame for setting and monitoring the communication system etc. as different from a user frame containing an actual data signal transmitted from a terminal (such as a server) etc.

The database managing unit DBCTL is provided with an address table FDB and the link table LDB, and manages them, and besides, retains a fabric switch identifier SWFID which is previously uniquely set for each of the fabric switches. In the address table FDB, a correspondence relation between each of the ports and a MAC address of a terminal (such as a server) etc. which exists beyond each of the ports is registered. The frame-transfer control unit FFCTL is provided with a function of controlling the transmission/reception of the control frame between each of the ports (P1, P2, P3, and so on) and the control-frame managing unit CFCTL. The FFCTL is further provided with a function of controlling the transfer of the frame (such as the user frame) to/from each of the ports (P1, P2, P3, and so on) based on the information retained by each of the tables (FDB and LDB) of the DBCTL. The failure detecting unit DET detects whether or not the failure occurs in the communication path between each of the ports (P1, P2, P3, and so on) and the port switch connected thereto. Although not particularly limited, for example, if a period during which the control frame cannot be received from the port switch reaches a predetermined period, the DET determines that the failure occurs in the port corresponding thereto.

In such a configuration, the fabric switch SWF of FIG. 5A performs, for example, a process as illustrated in FIG. 6. First, in order to make each of the port switches recognize the presence of the SWF itself, the SWF transmits a fabric switch identifier SWFID from all the ports (P1, P2, P3, and so on) (step S101). More specifically, the control-frame generating unit CFG of FIG. 5A generates the control frame containing the SWFID in the database managing unit DBCTL, and the frame-transfer control unit FFCTL transmits the control frame from each of the ports (P1, P2, P3, and so on) toward each of the port switches.

Then, the fabric switch SWF receives the control frame containing only the port switch identifier SWPID or additionally the sub link identifier (domain identifier) SLKID (step S102). More specifically, the control-frame analyzing unit CFA of FIG. 5A analyzes the control frame received by the frame-transfer control unit FFCTL via each of the ports (P1, P2, P3, and so on), and determines only the SWPID or additionally the SLKID contained therein. Then, in the database managing unit DBCTL, the relations among each of the ports and the SWPID, the SLKID, and the information from the failure detecting unit DET indicating whether the failure occurs or not are retained by the link table LDB.

The link table LDB illustrated in FIG. 5B illustrates the relations among each of the ports (P1, P2, P3, and so on), the port switch identifier SWPID and the sub link identifier (domain identifiers) SLKID which have been received by the ports, and the information indicating whether the failure occurs in each of the ports or not. When the SWF1 of FIG. 2 is exemplified, the LDB of FIG. 5B illustrates a case that the different SWPIDs [1], [2], and [3] from each other are received from the ports P1, P2, and P3, that the same SLKID [1] is received from the P1 and the P2, and that the failure occurs in the communication path of the P2. In this case, by the fabric switch SWF, the database managing unit DBCTL retaining such an LDB is functioned as a domain identifying unit. As illustrated in FIG. 5B, by receiving the same SLKID [1], the domain identifying unit (DBCTL) sets the sub link SLK as described in FIG. 4 for the P1 and the P2. As a result, the domain identifying unit (DBCTL) recognizes that the same multi-chassis link aggregation (domain group) is set for the P1 and the P2 and for the SWP1 and the SWP2 beyond them.

Subsequently, by the fabric switch SWF, the database managing unit DBCTL having the link table LDB as illustrated in FIG. 5B is functioned as a switch-number detecting unit. The switch-number detecting unit (DBCTL) detects the number of the port switches corresponding to the communication path without the failure from among the port switches. At this time, the switch-number detecting unit (DBCTL) detects the number (K) of the switches of the SWP corresponding to the communication path without the failure while regarding the port switches SWP having the same sub link identifier (domain identifier) SLKID as one switch (step S103).

For example, in the examples of FIG. 5B and FIG. 2, the failure occurs in one (P2 side) of the two communication paths between the port switches SWP1, SWP2 and the ports P1, P2 for which [1] is set as the sub link identifier (domain identifier) SLKID, and therefore, the switch-number detecting unit (DBCTL) counts one switch for the SWP1 and the SWP2. Then, the switch-number detecting unit (DBCTL) detects totally two switches for the number (K) of the switches so as to be counted by adding one port P3 to the above-described one switch. Note that the switch-number detecting unit (DBCTL) counts zero switch for the SWP1 and the SWP2 if the failure occurs in both of the two communication paths between the SWP1, SWP2 and the P1, P2 as described in FIG. 1, or counts one switch for them if no failure occurs in both of them.

Then, by the fabric switch SWF, the control-frame generating unit CFG and the frame-transfer control unit FFCTL are functioned as a switch-number transmitting unit, and the control frame containing the number (K) of the switches is transmitted from all the ports (P1, P2, P3, and so on) (step S104). More specifically, the switch-number transmitting unit (CFG) generates the control frame containing the number (K) of the switches detected by the switch-number detecting unit (DBCTL). Then, the switch-number transmitting unit (FFCTL) transmits the control frame from each of the ports (P1, P2, P3, and so on) to each of the port switches.

<<Outline of Port Switch (Network Relay Device)>>

Figures 7A, 7B:
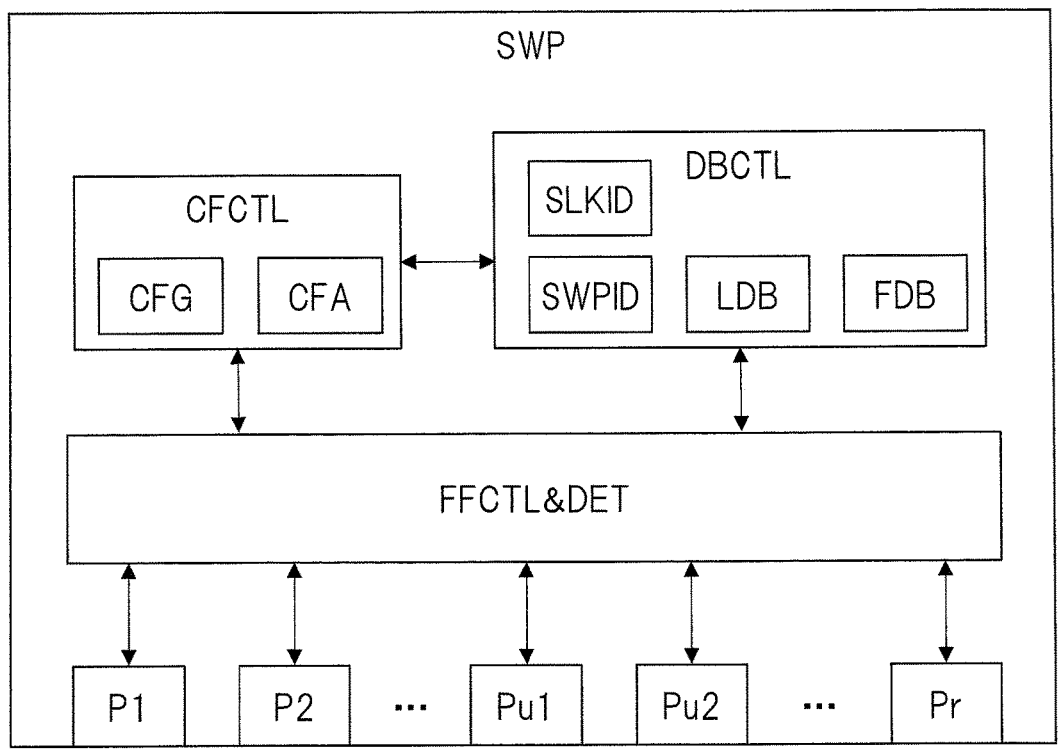
FIG. 7A is a block diagram illustrating a schematic configuration example of a principal part of a port switch of the communication system of FIG. 1.
FIG. 7B is an explanatory diagram illustrating an example of retained contents retained in a link table of FIG. 7A.
Figure 8:
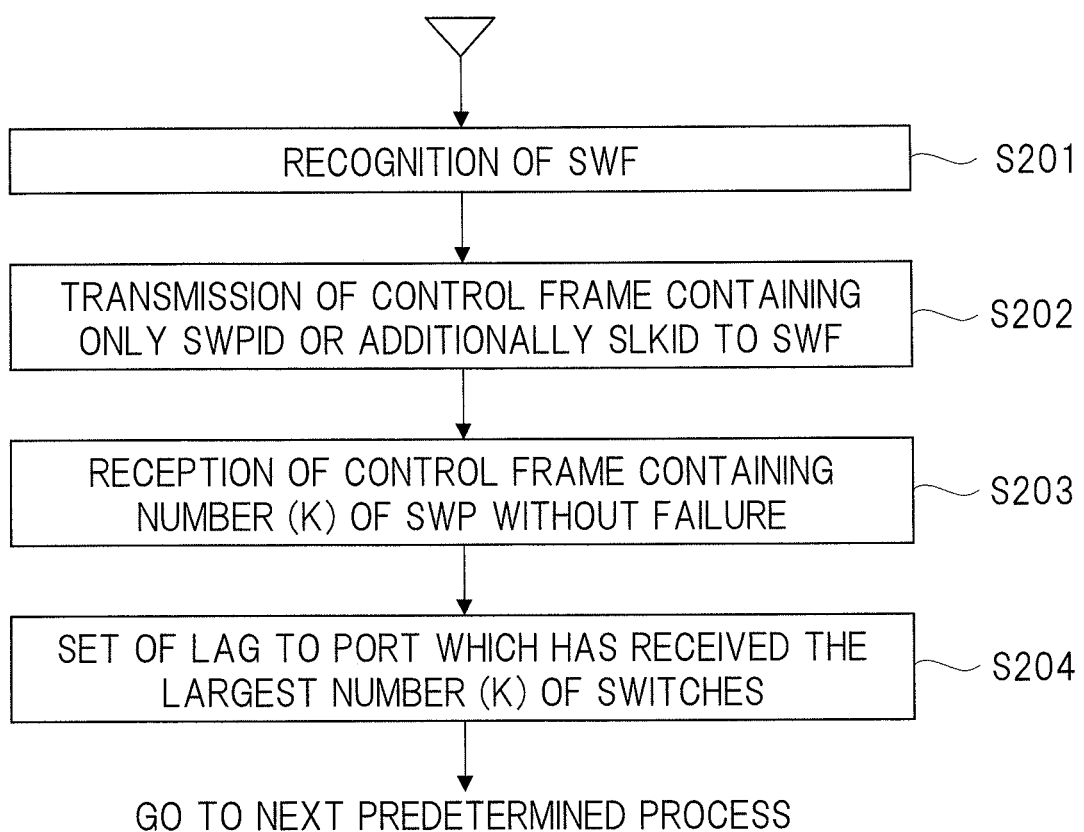
FIG. 8 is a flowchart illustrating a principal operation example of the port switch in FIGS. 7A and 7B.

FIG. 7A is a block diagram illustrating a schematic configuration example of a principal part of the port switch of the communication system of FIG. 1, and FIG. 7B is an explanatory diagram illustrating an example of retention contents provided in a link table of FIG. 7A. FIG. 8 is a flowchart illustrating a principal operation example of the port switch of FIGS. 7A and 7B. The port switch (network relay device) SWP illustrated in FIG. 7A is different from the above-described configuration example of FIG. 5A in that the port switch identifier SWPID instead of the SWFID of FIG. 5A is retained in the database managing unit DBCTL and in that the sub link identifier (domain identifier) SLKID is retained. Further, the SWP illustrated in FIG. 7A is different from FIG. 5A in that the SWP is provided with the fabric-switch ports P1, P2, and so on, user-switch ports (user ports) Pu1, Pu2, and so on, and the redundancy port Pr as the ports. The configuration other than these configurations is similar to that of FIG. 5A, and therefore, explanation will be made hereinafter by focusing on the differences from FIG. 5A.

When the port switch SWP1 of FIG. 1 is exemplified, the fabric switches SWF1 and SWF2 are connected to the fabric-switch ports P1 and P2 of FIG. 7A, the user switches SWU1 and SWU2 are connected to the user ports Pu1 and Pu2, and the port switch SWP2 is connected to the redundancy port Pr, respectively. Note that the two fabric-switch ports P1 and P2 are representatively illustrated here. However, if three or more fabric switches are provided, three or more ports are correspondingly provided. Also, here, the two user ports Pu1 and Pu2 are representatively illustrated. However, if three or more user switches are provided, three or more ports are correspondingly provided.

In the example of FIG. 1, the redundancy port Pr is provided in the port switches SP1 and SWP2 for which the multi-chassis link aggregation (domain group) is set. However, for example, if the port switches SWP1 to SWP3 are achieved by the box type switch devices having the same configuration, it is not particularly required to provide the Pr in the SWP3. In this case, the Pr can be used as the user port or the fabric-switch port by internal setting. Also, allocation of each of the ports (for example, for the fabric switch, for the user switch, etc.) can be appropriately changed by the internal setting. Since the basic functional configuration of FIG. 7A is similar to the functional configuration of FIG. 5A, the fabric switch and the port switch can be configured of the box type switch devices having the same configuration.

The port switch identifier SWPID of FIG. 7A is previously uniquely set for each of the port switches. Also, the sub link identifier (domain identifier) SLKID indicates that the same multi-chassis link aggregation (domain group) is set between itself and another port switch, and is previously set for the target port switches (in the example of FIG. 1, SWP1 and SWP2).

In such a configuration, the port switch SWP of FIG. 7A performs, for example, a process as illustrated in FIG. 8. First, the SWP recognizes the fabric switch SWF (step S201). More specifically, in accordance with the above-described step S101 of FIG. 6, the control-frame analyzing unit CFA of FIG. 7A analyzes the control frame which has been received by the frame-transfer control unit FFCTL via each of the ports (P1, P2, and so one), and determines the fabric switch identifier SWFID contained therein. In the database managing unit DBCTL of FIG. 7A, the relation between the SWFID and each of the ports (P1, P2, and so on) is retained by the link table LDB.

Subsequently, by the port switch SWP, the control-frame generating unit CFG and the frame-transfer control unit FFCTL are functioned as a domain transmitting unit. The domain transmitting unit transmits the control frame containing only the port switch identifier SWPID or additionally the sampling identifier (domain identifier) SLKID to each of the fabric switches SWF (step S202). For example, in the case of the SWP1 and the SWP2 of FIG. 1, the domain transmitting unit (CFG) generates the control frame containing the SLKID in addition to the SWPID in the database managing unit DBCTL. Then, the domain transmitting unit (FFCTL) transmits the control frame from the fabric-switch ports P1, P2, and so on toward each of the fabric switches SWF recognized in the step S201.

Then, by the port switch SWP, the frame-transfer control unit FFCTL, the control-frame analyzing unit CFA, and the database managing unit DBCTL are functioned as a link setting unit. The link setting unit receives the control frame containing the number (K) of the switches of the SWP corresponding to the communication path without the failure (step S203), and sets the link aggregation group LAG for one or a plurality of ports which have received the largest number (K) of the switches (step S204). More specifically, in accordance with the above-described step S104 of FIG. 6, the link setting unit (CFA) analyzes the control frame received by the FFCTL via each of the ports (P1, P2, and so on), and determines the number (K) of switches contained therein. Then, in the link setting unit (DBCTL), the relation between each of the ports and the number (K) of the switches is retained by the link table LDB, and the LAG is set based on that.

The link table LDB illustrated in FIG. 7B illustrates relations among each of the ports (P1, P2, P3, and so on), the fabric-switch identifier SWID received by each of the ports in the step S201, the number (K) of the switches received by each of the ports in the step S203, and the link aggregation group identifier LAGID. When the SWP1 of FIG. 2 is exemplified, in the LDB of FIG. 7B, different SWFIDs [1] and [2] have been received from the ports P1 and P2, respectively, and two switches (K) have been received from both of the P1 and the P2. In this case, since the largest number (K) of the switches is two, the database managing unit DBCTL allocates the same LAGID [1] to the P1 and the P2 which have received two switches as the number (K) of the switches, so that the link aggregation group LAG is set. The ports for which the LAG is set mean the normal ports.

As described above, by using the communication system and the network relay device of the present embodiment, the failure tolerance is typically improved. Note that each of the port switch SWP and the fabric switch SWF is configured of a box type switch device here. By using the box type fabric system using the box type switch device, various beneficial effects as described above are obtained more than those in the case using a system configured of a chassis type switch device in which both functions of the port switch and the fabric switch are housed in one package. However, the configuration is not always limited to the configuration of the box type switch device, and the method of setting the link aggregation as described in FIG. 9 can be applied even when the configuration of the chassis-type switch device is used, and the problems as described in FIGS. 10 to 12 can arise in accordance with this, and therefore, similar effects are obtained by the similar application.

In the foregoing, the invention made by the inventor has been concretely described based on the embodiments. However, the present invention is not limited to the foregoing embodiments and various modifications and alterations can be made within the scope of the present invention. For example, the above-described embodiments have been explained in detail in order to easily understand the present invention, and are not always limited to the one including all configurations explained. Also, a part of the configuration of one embodiment can be replaced with the configuration of another embodiment, and the configuration of another embodiment can be added to the configuration of one embodiment. Further, another configuration can be added to, eliminated from, and replaced with a part of the configuration of each embodiment.

For example, the explanation has been made here mainly by exemplifying the communication system using the LAN switch (L2 switch). However, the invention can be similarly applied even to a communication system using an L3 switch.

What is claimed is:

1. A communication system comprising:
   a plurality of port switches including first and second port switches;
   a plurality of fabric switches building a communication path between the plurality of port switches; and
   a user switch connected to the first and second port switches via different communication lines from each other for setting link aggregation for ports serving as connection sources of the communication lines,
   wherein each of the plurality of port switches is directly connected to each of the plurality of fabric switches via different communication lines from each other, respectively,
   wherein the first and second port switches are set in a same domain group, the first and second port switches each comprise at least one redundancy port, and a redundancy port of the first port switch is connected to a redundancy port of the second port switch via a common communication line,
   wherein each of the plurality of fabric switches is configured to:
      detect a number of the port switches corresponding to communication lines without failure from among the communication lines directly between the respective fabric switch and the plurality of port switches while logically regarding the first and second port switches as one switch, and
      transmit the detected number of the port switches to each of the plurality of port switches to which the respective fabric switch is directly connected, and
   wherein each of the plurality of port switches is configured to:
      receive the respective detected number of the port switches from each of the plurality of fabric switches to which the respective port switch is directly connected, and
      determine, among a plurality of ports of the respective port switch, a set of ports that has received a largest number of the detected number of the port switches,
      set link aggregation for the set of ports such that the set of ports for which the link aggregation is set function logically as one port.

2. The communication system according to claim 1,
   wherein each of the plurality of fabric switches is configured to:
      detect whether or not failure occurs in the communication lines directly between the respective fabric switch and the plurality of port switches,
      detect the number of the port switches corresponding to the communication lines without the failure among the plurality of port switches; and
      transmit the detected number of the switches to each of the plurality of port switches, and
   wherein the detection of the number of the port switches comprises:
      count a value of zero ports switch for the number of the first and second port switches in response to detecting failure occurring in both of the communication lines directly between the fabric switch and the first and second port switches, and
      count a value of one port switch in response to detecting failure occurring in only one or no failure occurring in both of the communication lines directly between the fabric switch and the first and second port switches.

3. The communication system according to claim 2,
   wherein each of the first and second port switches transmits a same domain identifier for indicating that the same domain group is set to each of the plurality of fabric switches, and
   each of the plurality of fabric switches recognizes the setting of the same domain group to the first and second port switches in response to the first and second port switches receiving the same domain identifier.

4. The communication system according to claim 3, wherein each of the plurality of port switches is configured of a box type switch device, and
each of the plurality of fabric switches is configured of a box type switch device.

5. The communication system according to claim 1, wherein, when a port switch transmits a frame from an aggregation group set by the link aggregation toward a fabric switch, one port is selected from the ports constituting the aggregation group based on a predetermined rule and the frame is transmitted from the selected port.

* * * * *